United States Patent Office 3,265,732
Patented August 9, 1966

3,265,732
NOVEL 5a,6-ANHYDROTETRACYCLINES
Philip Andrew Miller, West Nyack, John Henry Edward James Martin, New City, and Lester Allen Mitscher, Pearl River, N.Y., assignors to American Cyanamid Company, Stamford, Conn., a corporation of Maine
No Drawing. Filed Feb. 28, 1964, Ser. No. 348,294
14 Claims. (Cl. 260—559)

This application is a continuation-in-part of our co-pending application Serial No. 340,793, filed on January 28, 1964, now abandoned.

This invention relates to new tetracycline precursors and, more particularly, is concerned with novel 5a,6-anhydrotetracyclines and with methods of preparing these novel compounds. The novel 5a,6-anhydrotetracyclines of the present invention may be represented by the following general formula:

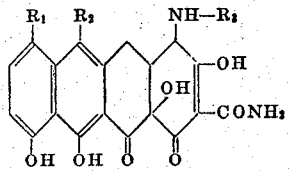

wherein $R_1$ is hydrogen, chlorine or bromine, $R_2$ is hydrogen or methyl, and $R_3$ is hydrogen or methyl. The novel compounds of the present invention have characteristic ultraviolet absorption spectra and pronounced acid-stability. They may be conveniently purified by partition-column chromatography and by countercurrent distribution techniques.

The novel 5a,6-anhydrotetracyclines of the present invention may be readily prepared by cultivating under submerged aerobic conditions any strain of a species of the genus Streptomyces, which species is capable of producing one of the tetracyclines, when the medium is modified to include a small amount of a methylation inhibitor as more particularly described hereinafter. The mechanism by which the novel 5a,6-anhydrotetracyclines are produced in a medium to which methylation inhibitors have been added and which is fermented with a strain of a species of the genus Streptomyces is not completely understood and no theory is advanced with respect thereto. It is a demonstrable fact, however, that by the use of certain methylation inhibitors the novel 5a,6-anhydrotetracyclines of the present invention are produced in good yield.

The present invention is not particularly concerned with any specific microorganism except to the extent that it is concerned with those microorganisms that produce one of the tetracyclines by fermentative biosynthesis. Insofar as is presently known, all such microorganisms are of the genus Streptomyces. Among the strains of *S. aureofaciens* which will introduce chlorine or bromine at the 7-position of the novel 5a,6-anhydrotetracyclines of the present invention are the following:

*S. aureofaciens*:
  ATCC 10762
  ATCC 10762f
  ATCC 10762g
  ATCC 10762h
  ATCC 10762i
  ATCC 11989
  ATCC 12416a

*S. aureofaciens*—Continued
  ATCC 12416b
  ATCC 12416c
  ATCC 12551
  ATCC 12552
  ATCC 12553
  ATCC 12554
  ATCC 12748
  ATCC 12749
  ATCC 12750
  ATCC 12751
  NRRL 2209
  NRRL B1286
  NRRL B1287
  NRRL B1288

Representative strains of the genus Streptomyces which are non-halogenating strains, that is, which will not introduce halogen at the 7-position of the novel 5a,6-anhydrotetracyclines are the following:

*S. aureofaciens*:
  ATCC 13908
  ATCC 13909
  ATCC 13910
  ATCC 13911

Representative strains of the genus Streptomyces which would normally introduce a hydroxy group at the 5-position and which are non-halogenating strains, and which will introduce neither halogen at the 7-position nor hydroxy at the 5-position of the 5a,6-anhydrotetracyclines, are *S. rimosus* ATCC 10970, *S. rimosus* NRRL 2234, *S. rimosus* NRRL 3098 and *S. platenis* NRRL 2364.

The conditions of the fermentation are generally the same as for the presently known methods of producing tetracycline, chlortetracycline and 7-chloro-6-demethyltetracycline by fermentation. Thus, the fermentation medium contains the usual nutrients and mineral substances. Suitable nutrient substances include starch, dextrose, cane sugar, glucose, molasses, soybean meal, peanut meal, yeast, meat extracts, peptone, urea, corn steep liquor, distillers solubles, inorganic salts and other conventional substances. The inorganic salts include such things as calcium carbonate, ammonium sulfate, ammonium chloride, and the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of chlortetracycline shown in United States Patent No. 2,482,055 to Duggar, for the production of tetracycline shown in United States Patent No. 2,743,018 to Minieri et al., and for the production of 7-chloro-6-demethyltetracycline shown in United States Patent No. 2,878,289 to McCormick et al.

When a 7-halogenating strain of the genus Streptomyces is employed it is necessary only to modify the fermentation medium so that it contains at least 10 parts per million and preferably 1000–1500 parts per million of chloride ions when the 7-chloro substituent is desired, or a like amount of bromide ions when the 7-bromo substituent is desired.

The methylation inhibitors which are operative in producing the novel 5a,6-anhydrotetracyclines of the present invention are ethionine and sulfonamides which may be represented by the following general formula:

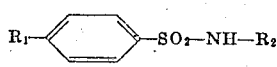

wherein $R_1$ is a member of the group consisting of hydrogen and amino and $R_2$ is a member of the group consisting of phenyl, pyridinyl, triazinyl, pyridazinyl, pyrimidinyl,

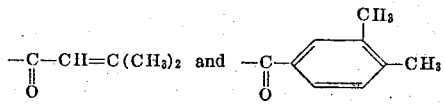

Typical sulfonamides according to the above definition which are operative in producing the novel 5a,6-anhydrotetracyclines of the present invention are sulfadiazine, N'-($\beta,\beta'$-dimethylacroyl)sulfanilamide,
2-sulfanilamido-4,6-dimethyl-s-triazine,
3-sulfanilamido-6-methylpyridazine,
3-sulfanilamido-4,6-dimethylpyridazine,
3-sulfanilamido-6-methoxypyridazine,
3-sulfanilamido-6-methylthiopyridazine,
2-sulfanilamido-5-methylpyrimidine,
2-sulfanilamido-4,6-dimethylpyrimidine,
N'-(3,4-dimethyl-benzoyl)sulfanilamide,
N'-(3,5-dichlorophenyl)sulfanilamide,
2-sulfanilamido-6-chloropyrazine,
N'-phenylsulfanilamide,
2-sulfanilamidopyridine,
3-sulfanilamidopyridazine,
3-sulfanilamido-4,5-dimethylpyridazine,
2-benzenesulfonamidopyrimidine,
2-sulfanilamido-5-chloropyrimidine and
4-sulfanilamidopyrimidine.

Ethionine may be employed in either the D-, L-, or D,L- modifications or mixtures thereof.

The amount of methylation inhibitor that may be used is a factor of some importance. In general, we have found that a useful range is from about 10 mg. per liter to about 1,000 mg. per liter of fermentation mash, preferably from about 100 to about 400 mg. per liter. The methylation inhibitors may also be used in the form of their alkali metal or alkaline earth metal salts if desired, and ethionine may also be employed in the form of its lower alkyl esters.

Since methylation inhibitors are never 100% effective, some methylation occurs and mixtures of the novel 5a,6-anhydrotetracyclines of the present invention are always obtained. For example, when a non-halogenating strain of a species of the genus Streptomyces is employed there will be obtained a mixture of 4-dedimethylamino-4-amino-5a,6-anhydrotetracycline, 4-dedimethylamino-4-methylamino-5a,6-anhydrotetracycline, 4-dedimethylamino-4-amino-6-demethyl-5a,6-anhydrotetracycline and 4-dedimethylamino-4-methylamino-6-demethyl-5a,6-anhydrotetracycline. After the completion of a fermentation to produce a mixture of 5a,6-anhydrotetracyclines, the mixture of products may be recovered from the whole harvest mash in the following manner. The whole harvest mash is first filtered and the filter cake so obtained is suspended in water and acidified to a pH of about 1.5 by the addition of a mineral acid. Then, about 3 ml. per liter of whole harvest mash of a strong acid such as perchloric acid, trichloroacetic acid or trifluoroacetic acid is added. The acidified suspension is then extracted by stirring with n-butanol or methyl isobutyl ketone and then separating the solvent layer containing the 5a,6-anhydrotetracyclines. Water and diatomaceous earth are then added to the extract and the pH of this mixture is adjusted to about 6.6 by the addition of triethylamine. This mixture is then filtered and the filter cake is extracted with a solution of ethyl acetate containing about 3 ml. per gram of filter cake of a strong acid such as perchloric acid, trichloroacetic acid or trifluoroacetic acid. This extract is then concentrated to a small volume by distillation and then diluted with a liquid lower aliphatic hydrocarbon, e.g., petroleum ether or Skellysolve C, to precipitate the mixture of 5a,6-anhydrotetracyclines. The mixture of 5a,6-anhydrotetracyclines may then be separated into its component pure compounds by standard purification procedures such as partition-column chromatography and countercurrent distribution.

The novel compounds of the present invention are useful as antibacterial agents since they are biologically active and possess broad-spectrum antibacterial activity. For example, the antibacterial spectrum of 4-dedimethylamino-4-amino-5a,6-anhydrotetracycline, 4-dedimethylamino-4-methylamino-5a,6-anhydrotetracycline and 4-dedimethylamino-4-amino-6-demethyl-5a,6-anhydrotetracycline were determined in a standard manner by the agar dilution streak technique. The antibacterial spectrum of a compound represents the amount required to inhibit the growth of various typical bacteria and is commonly used in testing new antibiotics. The minimal inhibitory concentrations expressed in gammas per milliliter of these three compounds against various test organisms is shown in Table I below. For comparison purposes, the antibacterial spectrum of tetracycline hydrochloride against the same organisms is also included.

TABLE I

| Organism | (1) | (2) | (3) | (4) |
|---|---|---|---|---|
| Bacillus cereus ATCC 10702 | 25 | 12.5 | 50 | 0.2 |
| Bacillus subtilis ATCC 6633 | 12.5 | 25 | 50 | 0.8 |
| Escherichia coli ATCC 9637 | 12.5 | 100 | 50 | 12.5 |
| Escherichia coli Lederle 22 | 6.2 | 25 | 50 | 6.2 |
| Klebsiella pneumonia ATCC 10031 | 12.5 | 25 | 25 | 3.1 |
| Mycobacterium ranae | 3.1 | 12.5 | 12.5 | 1.5 |
| Mycobacterium smegmatis ATCC 607 | 6.2 | 25 | 12.5 | 1.5 |
| Proteus vulgaris ATCC 9484 | 12.5 | 25 | 12.5 | 12.5 |
| Pseudomonas aeruginosa ATCC 10145 | 25 | 100 | 50 | 50 |
| Salmonella gallinarum Lederle 694 | 6.2 | 50 | 25 | 12.5 |
| Staphylococcus aureus ATCC 6538P | 12.5 | 25 | 50 | 1.5 |
| Staphylococcus aureus, 69 | 25 | 50 | 50 | 100 |
| Staphylococcus aureus Rose | 12.5 | 25 | 50 | 100 |
| Staphylococcus aureus Smith | 6.2 | 25 | 25 | 3.1 |
| Streptococcus faecalis ATCC 8043 | 12.5 | 25 | 50 | 1.5 |
| Streptococcus pyogenes C203 | 6.2 | 12.5 | 12.5 | 0.8 |
| Streptococcus sp., nonhemolytic, 11 | 12.5 | 50 | 50 | 100 |
| Streptococcus sp., B-hemolytic, 80 | 12.5 | 50 | 50 | 100 |

(1) 4-dedimethylamino-4-amino-5a,6-anhydrotetracycline.
(2) 4-dedimethylamino-4-methylamino-5a,6-anhydrotetracycline.
(3) 4-dedimethylamino-4-amino-6-demethyl-5a,6-anhydrotetracycline.
(4) Tetracycline hydrochloride.

The novel 5a,6-anhydrotetracyclines of the present invention are useful in the preparation of tetracylines having one or two radioactive carbon atoms in the 4-dimethylamino group, for tracer studies. Upon reaction of a 5a,6-anhydrotetracyline with one equivalent (where $R_3$ is methyl) or with two equivalents (where $R_3$ is hydrogen) of $C^{14}$ labelled methyl iodide, under standard conditions, there is obtained the corresponding 5a,6-anhydrotetracycline having one or both of the carbon atoms in the 4-dimethylamino group labelled with radioactive carbon. Heretofore, it was possible to make $C^{14}$ labelled tetracyclines with a specific activity of only about 1 microcuries per micromole by adding a $C^{14}$ labelled nutrient to a fermentation mash. By employing the novel 5a,6-anhydrotetracyclines of the present invention, it is possible to obtain 5a,6-anhydrotetracyclines with a specific activity of from 25 to 50 microcuries per micromole and the compounds are specifically labelled in the 4-dimethylamino group. The radioactive 5a,6-anhydrotetracyclines so obtained may then be converted to the corresponding tetracyclines by the biological transformation process set forth in U.S. Patent No. 3,053,740 to Miller et al.

The organic bases of this invention form acid addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic succinic, tartaric, acetic, benzoic, gluconic, ascorbic and related acids. For purposes of this invention the free bases are equivalent to their acid-addition salts.

As previously indicated the fermentation process for the production of the new precursors of the present invention will be generally the same as those for the production of their related tetracycline antibiotics with the exception that a methylation inhibitor is added to the medium. Thus, U.S. Patents Nos. 3,092,556 and 2,734,018 (where $R_1$=H); 2,878,289 and 3,105,016 (where $R_1$=Br); 2,878,289 (where $R_2$=H); and 2,482,055 and 2,609,329 (where $R_1$=Cl) describe methods which will be useful in the production of the 5a,6-anhydrotetracyline precursors.

The invention will be described in greater detail in conjunction with the following specific examples.

*Example 1.*—*Preparation of a mixture of 4-dedimethylamino-4-amino-5a,6-anhydrotetracycline, 4-dedimethylamino-4-methylamino-5a,6-anhydrotetracycline and 4-dedimethylamino-4-amino - 6 - demethyl-5a,6-anhydrotetracycline*

A vegetative inoculum was prepared in a 250 ml. Erlenmeyer flask containing 50 ml. of the following medium:

| | Gm. |
|---|---|
| Corn steep liquor | 20.0 |
| Sucrose | 30.0 |
| $(NH_4)_2SO_4$ | 2.0 |
| $CaCO_3$ | 7.0 |
| Water, qs. to 1000 ml. | |

This medium was sterilized, inoculated with spores of *S. rimosus* NRRL 3098 and then placed on a reciprocating shaker operating at 110 strokes per minute at 28° C. for 32 hours. Two ml. portions of this vegetative inoculum were used to inoculate sterilized 25 ml. portions of the following medium, contained in 250 ml. Erlenmeyer flasks:

*S. rimosus* medium

| | | |
|---|---|---|
| KCl | gm | 1.23 |
| $H_3PO_4$ (85%) | gm | 0.24 |
| $NH_4Cl$ | gm | 1.50 |
| $(NH_4)_2SO_4$ | gm | 8.0 |
| $CaCO_3$ | gm | 10.0 |
| Starch | gm | 55.0 |
| $MgCl_2 \cdot 6H_2O$ | gm | 2.0 |
| $FeSO_4 \cdot 7H_2O$ | gm | 0.060 |
| $MnSO_4 \cdot 4H_2O$ | gm | 0.050 |
| $CoCl_2 \cdot 6H_2O$ | gm | 0.005 |
| L-histidine | gm | 0.10 |
| Lard oil | ml | 20.0 |
| Water, qs. to 1000 ml. | | |

The inoculated flasks were incubated on a 180 r.p.m. rotary shaker at 28° C. for 48 hours, at which time sufficient L-ethionine was added to give a concentration of 80 mcg. per ml. The fermentation was continued for an additional 48 hours and then harvested. A spectrophotometric assay indicated a total absorbance at 430 mµ equivalent to about 1000 mcg./ml. of anhydrotetracycline. An ethyl acetate extract of the fermentation mash was obtained by mixing equal volumes of mash, 1.4% perchloric acid and ethyl acetate. This extract was applied to strips of Whatman #1 paper which had been previously buffered at pH 7.0 with solution of 0.1 M $Na_2HPO_4$ containing 0.1% of the disodium salt of ethylenediaminetetraacetic acid. The strips were developed with water saturated n-butanol for 12 hours. Orange fluorescent zones were visible under ultraviolet illumination at Rƒ values of 0.12, 0.24 and 0.05. The identity and concentrations of each of these components are as follows:

| Rƒ. | Precursor | Concentration in Mash mcg./ml. |
|---|---|---|
| 0.12 | 4-dedimethylamino-4-amino-5a,6-anhydrotetracycline. | 500 |
| 0.24 | 4-dedimethylamino-4-methylamino-5a,6-anhydrotetracycline. | 300 |
| 0.05 | 4-dedimethylamino-4-amino-6-demethyl-5a, 6-anhydrotetracycline. | 200 |

*Example 2.*—*Alternative methods for preparing a mixture of 4-dedimethylamino - 4 - amino-5a,6-anhydrotetracycline, 4-dedimethylamino-4-methylamino-5a,6-anhydrotetracycline and 4-dedimethylamino - 4 - amino-6-demethyl-5a,6-anhydrotetracycline*

(a) The procedure of Example 1 may be followed with the exception that instead of adding L-ethionine, DL-ethionine is added to a concentration of 80 mcg. per ml.

(b) The procedure of Example 1 may be followed with the exception that instead of adding L-ethionine, D-ethionine is added at a concentration of 80 mcg. per ml.

(c) The procedure of Example 1 may be followed with the exception that instead of adding L-ethionine at the end of 48 hours of fermentation, sulfadiazine at a concentration of 320 mcg. per ml. is added to the medium before it is sterilized and inoculated.

(d) The procedure of Example 1 may be followed with the exception that sulfadiazine is added, at a concentration of 80 mcg. per ml., to the medium prior to sterilization and inoculation. Then, the fermentation is carried out for 48 hours, at which time L-ethionine is added at a concentration of 80 mcg. per ml. and the fermentation is continued as in Example 1.

*Example 3.*—*Production of a mixture of 4-dedimethylamino-4-amino-6-demethyl-5a,6-anhydrotetracycline, 7-chloro-4-dedimethylamino - 4 - amino-6-demethyl-5a,6-anhydrotetracycline and 7-chloro-4-dedimethylamino-4-methylamino-6-demethyl-5a,6-anhydrotetracycline*

A shaker flask fermentation which resulted in the production of the above three tetracycline precursors was conducted in the following fermentation medium:

| | | |
|---|---|---|
| KCl | gm | 1.23 |
| $H_3PO_4$ (85%) | gm | 0.40 |
| $NH_4Cl$ | gm | 1.50 |
| $(NH_4)_2SO_4$ | gm | 8.0 |
| $CaCO_3$ | gm | 10.0 |
| Starch | gm | 55.0 |
| $MgCl_2 \cdot 6H_2O$ | gm | 2.0 |
| $FeSO_4 \cdot 7H_2O$ | gm | 0.060 |
| $ZnSO_4 \cdot 7H_2O$ | gm | 0.10 |
| $MnSO_4 \cdot 4H_2O$ | gm | 0.050 |
| $CoCl_2 \cdot 6H_2O$ | gm | 0.005 |
| L-methionine | gm | 0.60 |
| L-histidine | gm | 0.80 |
| Lard oil | ml | 20.0 |
| L-ethionine | gm | 0.16 |
| Water, qs. to 1000 ml. | | |

A 25 ml. portion of this medium was measured into a 250 ml. Erlenmeyer flask, sterilized for 20 minutes at 120° C. and inoculated with 2.0 ml. of a vegetative inoculum of *S. aureofaciens* ATCC 12551 prepared as shown in Example 1. The fermentation was carried out for 24 hours at 28° C. and then at 25° C. for an additional 96 hours on a rotary shaker at 180 r.p.m. At this time an ethyl acetate extract was prepared and paper chromatographed as shown in Example 1. Orange fluorescent zones were observed at Rƒ 0.05, Rƒ 0.12 and Rƒ 0.21, corresponding to authentic 4-dedimethylamino-4-amino-6-demethyl-5a,6 - anhydrotetracycline, 7-chloro-4- dedimethylamino-4-amino-6-demethyl-5a,6-anhydrotetracycline and 7-chloro-4-dedimethylamino-4-methylamino-6-demethyl-5a,6-anhydrotetracycline, respectively.

*Example 4.—An alternative method for the production of a mixture of 4-dedimethylamino-4-amino-6-demethyl-5a,6-anhydrotetracycline, 7-chloro-4-dedimethylamino-4-amino-6-demethyl-5a,6-anhydrotetracycline, and 7-chloro - 4 - dedimethylamino - 4 - methylamino - 6 - demethyl-5a,6-anhydrotetracycline*

The procedure of Example 3 was followed, except that the following fermentation medium was used:

| | | |
|---|---|---|
| Corn steep liquor | gm | 30.0 |
| Lard oil | ml | 20.0 |
| Corn starch | gm | 55.0 |
| Cottonseed meal | gm | 2.0 |
| $CaCO_3$ | gm | 7.0 |
| $(NH_4)_2SO_4$ | gm | 5.0 |
| $NH_4Cl$ | gm | 1.50 |
| $FeSO_4 \cdot 7H_2O$ | gm | 0.040 |
| $ZnSO_4 \cdot 7H_2O$ | gm | 0.10 |
| $MnSO_4 \cdot 4H_2O$ | gm | 0.05 |
| $CoCl_2 \cdot 6H_2O$ | gm | 0.005 |
| L-ethionine | gm | 0.160 |
| Water, qs. to 1000 ml. | | |

Orange fluorescent zones were observed at $Rf$ 0.05, $Rf$ 0.12 and $Rf$ 0.21 corresponding to authentic 4-dedimethylamino-4-amino-6 - demethyl - 5a,6 - anhydrotetracycline, 7-chloro - 4 - dedimethylamino - 4 - amino - 6-demethyl-5a,6 - anhydrotetracycline and 7 - chloro - 4 - dedimethylamino-4-methylamino - 6 - demethyl - 5a,6 - anhydrotetracycline, respectively.

*Example 5.—Shaker flask production of 4-dedimethylamino-4-amino-5a,6-anhydrotetracycline*

A fermentation medium for the production of 4-dedimethylamino-4-amino-5a,6-anhydrotetracycline was prepared according to the following formulation:

| | | |
|---|---|---|
| $(NH_4)_2SO_4$ | gm | 6.0 |
| $CaCO_3$ | gm | 8.0 |
| $NH_4Cl$ | gm | 1.7 |
| $MnSO_4$ (70% tech. grade) | gm | 0.08 |
| Corn steep | gm | 20.0 |
| Starch | gm | 50.0 |
| Corn flour | gm | 14.5 |
| Lard oil | ml | 20.0 |
| Tap water, qs. to 1000 ml. | | |

Twenty-five ml. portions of this medium were placed in 250 ml. Erlenmeyer flasks. The flasks were stoppered with cotton plugs and then sterilized at 120° C. for 20 minutes. After sterilization the flasks were inoculated with 2.0 ml. portions of a vegetative inoculum of *S. aureofaciens* ATCC 13908 prepared as described in Example 1. The fermentation was carried out at 28° C. for 24 hours and then at 25° C. for 24 hours on a rotary shaker operating at 180 r.p.m. At this time (48 hours) a 1.0 ml. portion of a 4 mg. per ml. sterile solution of L-ethionine was added to each flask. The fermentation was continued for an additional 48 hours at 25° C. on the rotary shaker. At this time an ethyl acetate extract was prepared and paper chromatographed as shown in Example 1. An orange fluorescent zone was observed by ultraviolet illumination at $Rf$ 0.12 corresponding to that of authentic 4-dedimethylamino-4-amino-5a,6-anhydrotetracycline.

*Example 6.—Thirty liter fermentation preparation of a mixture of 4-dedimethylamino-4-amino-5a,6-anhydrotetracycline, 4-dedimethylamino - 4-methylamino-5a,6-anhydrotetracycline and 4-dedimethylamino-4-amino-6-demethyl-5a,6-anhydrotetracycline*

A 30 liter fermentation was carried out in a tank, essentially according to the method described in Example 1, except that the $CaCO_3$ was heat sterilized, at 125° C. for 25 minutes, separately from the rest of the medium. A 100 ml. portion of inoculum medium in a 500 ml. Erlenmeyer flask was inoculated with a spore suspension of *S. rimosus* NRRL 3098. After incubation at 28° C. for 32 hours on a reciprocating shaker (110 strokes per minute) this vegetative inoculum was used to inoculate fresh inoculum medium at a rate of 8.0 ml. of primary inoculum per 100 ml. of medium. A 1200 ml. portion of this inoculum was used to inoculate 30 liters of the fermentation medium. The fermentation was carried out with continuous agitation at 28° C. for 48 hours. At this time 3 gm. of DL-ethionine was added and the fermentation was continued for 48 hours. Paper chromatography of an ethyl acetate extract of the mash was performed as described in Example 1. Orange fluorescent zones were observed at $Rf$ 0.05, $Rf$ 0.12 and $Rf$ 0.24 corresponding to 4-dedimethylamino-4-amino-5a,6-anhydrotetracycline, 4-dedimethylamino-4-methylamino - 5a,6 - anhydrotetracycline and 4-dedimethylamino-4-amino-6-demethyl-5a,6-anhydrotetracycline, respectively.

*Example 7.—Preliminary stages of an isolation process*

Fermentation broth (32 l.) prepared as described in Example 6, was filtered with the aid of 10% diatomaceous earth. The filter cake was washed with 10 l. of water and the filtrate and washings were discarded. The washed cake was suspended in 10 l. of water, the pH was adjusted to 1.5 with concentrated hydrochloric acid, and 100 ml. of trifluoroacetic acid was added. After the addition of 15 l. of n-butanol, the mixture was stirred and filtered. The layers were separated and the aqueous phase was discarded. The partially extracted cake was re uspended in 15 l. of fresh n-butanol, stirred and filtered. The two pooled organic phases were diluted with 8 l. of water, the pH was adjusted to 6.5–6.7, 900 g. of diatomaceous earth was added, and the suspension was filtered. The filter cake was washed with methanol and filtered again. The washed cake was stirred with ethyl acetate containing 2% trifluoroacetic acid (3 ml./g. of cake) and the solids were removed by filtration. The filtrate was concentrated ten-fold under reduced pressure, the concentrate was poured onto a 750 g. dry packed silica gel column (2½ in. diameter) and the column was developed with 2% aqueous trifluoroacetic acid. The yellow effluents were collected and extracted with one-half volume of ethyl acetate. The ethyl acetate layer was mixed with 1% of n-butanol, 2 ml. of 12 N hydrochloric acid was added, and the solution was concentrated until anhydrous. Petroleum ether (B.P. 30–70° C.) was added until no further precipitation was observed. The precipitate was collected by centrifugation and was washed with additional petroleum ether and dried under reduced pressure at 45° C. for 2 hours whereupon 12.8 g. of a dry powdery mixture of the precursors was obtained. At 428 mµ this dried preparation had an optical density per milligram equivalent to 370 mcg. of standard 5a,6-anhydrotetracycline hydrochloride.

*Example 8.—Preparation of a mixture containing 4-dedimethylamino-4-amino-5a,6-anhydrotetracycline, 4-dedimethylamino - 4-methylamino-5a,6-anhydrotetracycline, 4 - dedimethylamino-4-amino-6-demethyl-5a,6-anhydrotetracycline, and 4-dedimethylamino-4-methylamino-6-demethyl-5α,6-anhydrotetracycline*

The preparation of fermentation mash (28 l.) was carried out as described in Example 6. The mash was extracted with an equal volume of chloroform and then filtered with the aid of diatomaceous earth. The filter pad and aqueous filtrate were combined and adjusted to a pH between 0.5 and 1.0 Then, 0.75 ml. of 75% Aerosol O.T.® was added per liter of mash. Ethyl acetate (30.1) was added and the whole was stirred for ten minutes and then filtered. The ethyl acetate layer was separated and the pad and aqueous filtrate were recombined and again extracted with 30 l. of ethyl acetate with the aid of Aerosol O.T.® solution. The combined ethyl acetate extracts were concentrated to a thick sludge, 2 l. of petroleum ether were added, and the mixture was transferred to an Erlenmeyer flask. The mixture was saturated with dry hydrogen chloride gas and chilled overnight at 4° C. The supernatant solution was decanted and the residue was dissolved in 800 ml. of methanol containing 25 g. of calcium chloride. The pH was adjusted to 8.0 with concentrated ammonium hydroxide solution and the copious yellow precipitate was removed by centrifugation. The precipitate was slurried in 100 ml. of methanol and 100 ml. of trifluoroacetic acid was added along with 2 liters of water. The mixture was extracted twice with 2 l. portions of ethyl acetate containing 10% butanol. The two extracts were combined and concentrated to an anhydrous butanol solution. Petroleum ether was added until no further precipitation occurred. The dried solid weighed 31 g. and at 428 m$\mu$ had an optical density per milligram equivalent to 420 mcg. of standard 5a,6-anhydrotetracycline hydrochloride.

*Example 9.—Preparation of a mixture containing 4-dedimethylamino-4-amino-5a,6-anhydrotetracycline, 4-dedimethylamino - 4-methylamino-5a,6-anhydrotetracycline, 4- dedimethylamino-4-amino-6-demethyl-5a,6-anhydrotetracycline, and 4-dedimethylamino-4-methylamino-6-demethyl-5a,6-anhydrotetracycline*

The preparation of fermentation mash (280 l.) was carried out as described in Example 6. The mash was adjusted to pH 0.5 with concentrated hydrochloric acid and 280 ml. of a 75% solution of Aerosol O.T.® was added. The mixture was stirred with 140 l. of methyl isobutyl ketone and filtered with the aid of diatomaceous earth. After separation of the organic phase the filter pad was resuspended in the aqueous phase and the mixture was reextracted with 280 l. of methyl isobutyl ketone with the aid of 280 ml. of Aerosol O.T.® solution. The combined organic phases were stirred with 250 l. of water and the pH was adjusted to 11.0 with sodium hydroxide solution. The alkaline extract was adjusted to pH 1.5 with concentrated hydrochloric acid and 300 ml. of trifluoroacetic acid was added. The solution was then extracted with 275 l. of n-butanol and the butanol extract was concentrated to a thick sludge. The addition of the minimal amount of petroleum ether precipitated 296 g. of a crude precursor mixture which at 428 m$\mu$ had an optical density per milligram equivalent to 300 mcg. of standard 5a,6-anhydrotetracycline hydrochloride.

*Example 10.—Cellulose column fractionation*

A cellulose powder column was prepared by packing a 2¾ inch diameter glass tube with 800 g. of cellulose powder which had been moistened with the lower phase of a system composed of n-butanol, ethyl acetate and 0.1 M phosphate buffer (pH 7.0) containing 0.1% ethylenediaminetetraacetic acid (1:1:1). The precursor mixture obtained according to the procedure of Example 7 (0.635 g.) was applied to the top and the column was developed with the organic phase. The effluent was separated into fractions of 20 ml. automatically by use of a fraction collector beginning with the first appearance of color. The various fractions were analyzed spectrophotometrically at 428 m$\mu$ and also by paper chromatography in a 0.1 M pH 7.0 phosphate system using water saturated n-butanol as developing solvent. Appropriate fractions were combined and treated separately. Excess buffer was removed by washing twice with an equal volume of 1% trifluoroacetic acid and the washed solutions were concentrated to anhydrous butanol layers and petroleum ether was added until no further precipitation was observed. Final purification could be achieved by solvent countercurrent distribution using a system composed of n-butanol-benzene-methanol-0.1 N hydrochloric acid (1:1:1:1).

4 - dedimethylamino - 4 - methylamino - 5a,6-anhydrotetracycline was isolated from column fractions 55–70. The pure substance had no definite melting point but gradually darkened and turned brown between 155 and 200° C. In 0.1 N hydrochloric acid solution, the compound showed ultraviolet and visible absorption maxima at 428, inf. 323, inf. 310, inf. 300, 270 and 222 m$\mu$ (log $\epsilon$ 3.85, 3.39, 3.71, 3.81, 4.64 and 4.43 respectively). Treatment with strong base liberated a mixture of ammonia and methyl amine.

4 - dedimethylamino - 4 - amino - 5a,6 - anhydrotetracycline was isolated from column fractions 71–85. The pure substance had no definite melting point but gradually darkened and turned brown. In 0.1 N hydrochloric acid solution, the compound showed ultraviolet and visible absorption maxima at 428, inf. 323, inf. 310, inf. 300, 270 and 222 m$\mu$ (log $\epsilon$ 3.92, 3.34, 3.64, 3.81, 4.69, and 4.44 respectively). Treatment with strong base liberated only ammonia.

4 - dedimethylamino - 4 - amino - 6 - demethyl - 5a,6-anhydrotetracycline was isolated from fractions 160–225. The pure substance had no definite melting point but gradually darkened and decomposed. In 0.1 N hydrochloric acid solution the compound had ultraviolet and visible absorption maxima at 420, inf. 320, inf. 305, inf. 295, 270, and 220 m$\mu$ (log $\epsilon$ 3.93, 3.23, 3.71, 3.83, 4.71 and 4.45 respectively). Treatment with strong base liberated only ammonia.

A small amount of 4 - dedimethylamino - 4 - methylamino - 6 - demethyl - 5a,6 - anhydrotetracycline was isolated from fractions 96–110. Treatment of the purified substance with strong base liberated a mixture of methyl amine and ammonia. Alkylation with methyl iodide produced 6-demethyl-5a,6-anhydrotetracycline.

*Example 11.—Reaction with methyl iodide*

Each of the compounds from the cellulose column fractionation were dissolved in tetrahydrofuran at a concentration of 1.0 mg./ml. Methyl iodide was added to give a final concentration of 5% by volume. The solutions were kept in capped tubes at 37° C. for 25 hours. Refluxing 3 hours with a drop of $\gamma$-collidine also works well. The reaction mixtures were paper chromatographed in a 0.3 M pH 3.0 NaH$_2$PO$_4$ system employing water saturated n-butanol as a developing solvent with the following results:

| Precursor | Methyl iodide reaction products |
| --- | --- |
| 4-dedimethylamino-4-amino-5a,6-anhydrotetracycline. | 4-dedimethylamino-4-methylamino-5a,6-anhydrotetracycline and anhydrotetracycline. |
| 4-dedimethylamino-4-methylamino-5a,6-anhydrotetracycline. | Anhydrotetracycline. |
| 4-dedimethylamino-4-amino-6-demethyl-5a,6-anhydrotetracycline. | 6-demethylanhydrotetracycline. |
| 4-dedimethylamino-4-methylamino-6-demethyl-5a,6-anhydrotetracycline. | Do. |

*Example 12.—Reaction with methyl iodide*

4 - dedimethylamino - 4 - amino - 5a,6 - anhydrotetracycline hydrochloride (45 mg.) was suspended in 45 ml. of freshly distilled tetrahydrofuran containing 5 ml. of methyl iodide and 0.1 ml. of s-collidine. The mixture was refluxed for three hours. The cooled reaction mixture was filtered and the filter residue was washed with ether. The combined filtrate and washings were evaporated to dryness producing slightly impure 5a,6-anhydrotetracycline as a bright yellow powder. Passage of the hydrochloride salt through a Celite partition column using the system heptane-ethyl acetate-methanol-water (55:45:15:6) resulted in 26 mg. of pure material identical in infrared and ultraviolet spectra and paper chromatographic behavior with an authentic specimen of 5a,6-anhydrotetracycline hydrochloride.

Under the same conditions 48 mg. of 4-dedimethylamino - 4 - amino - 6 - demethyl - 5a,6 - anhydrotetracycline hydrochloride produced 28 mg. of pure 6-demethyl-5a,6-anhydrotetracycline hydrochloride.

Using the same conditions 4 - dedimethylamino - 4-amino-5a,6-anhydrotetracycline hydrochloride reacted with $C^{14}$ labelled methyl iodide (specific activity 25 millicuries per millimole) to produce radioactive 5a,6-anhydrotetracycline hydrochloride specifically labelled at the 4-dimethylamino function.

*Example 13.—Preparation of precursor mixture from S. aureofaciens ATCC 12551*

The fermentation mash was prepared as described in Example 3 and the individual precursors were isolated in pure form by using minor modifications of the methods previously described.

Pure 7 - chloro - 4 - dedimethylamino - 4 - methylamino - 6 - demethyl - 5a,6 - anhydrotetracycline did not have a definite melting point but decomposed over a wide range. The substance showed ultraviolet and visible absorption maxima at 430, inf. 328, inf. 311, inf. 302, 271 and 224 m$\mu$ (log $\epsilon$ 3.84, 3.46, 3.60, 3.79, 4.66, and 4.45 respectively) in 0.1 N hydrochloric acid solution. Treatment with strong alkali liberated both ammonia and methylamine.

Pure 7 - chloro - 4 - dedimethylamino - 4 - amino - 6-demethyl - 5a,6 - anhydrotetracycline had no definite melting point, had an ultraviolet and visible absorption spectrum identical with the 4-methylamino derivative, liberated only ammonia with strong alkali and was converted to 7 - chloro - 6 - demethyl - 5a,6 - anhydrotetracycline upon reaction with methyl iodide.

*Example 14.—Preparation of 7-chloro-4-dedimethylamino-4-methyl amino-6-demethyl-5a,6-anhydrotetracycline*

This compound was produced using *S. aureofaciens* ATCC 12,551. The medium and methods for an inoculation preparation were identical to those described above for *S. rimosus* NRRL 3098. The fermentation was carried out in 250 ml. Erlenmeyer flasks containing 25 ml. of medium to which 200 mg./l. of L-ethionine was added before sterilization and inoculated with 2.0 ml. of a 32-hour vegetative inoculum. The flasks were mounted on a 180 r.p.m. rotary shaker and incubated for 24 hours at 28° C. and then transferred for the remainder of the fermentation to a 25° C. incubator. The fermentation was continued for an additional 72 hours (total=120 hours). The methods described previously for the isolation of the tetracycline precursors were, with minor modifications, used for the isolation of 7-chloro-4-dedimethylamino - 4 - methylamino-6-demethyl-5a,6-anhydrotetracycline from fermentation mash.

What is claimed is:

1. A compound selected from the group consisting of tetracycline precursors of the formula:

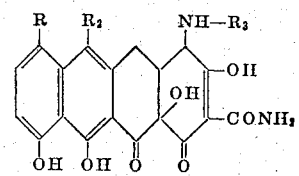

wherein $R_1$ is selected from the group consisting of hydrogen, chlorine and bromine, $R_2$ is selected from the group consisting of hydrogen and methyl and $R_3$ is selected from the group consisting of hydrogen and methyl; and the non-toxic acid-addition salts thereof.

2. 4 - dedimethylamino - 4-amino-5a,6-anhydrotetracyline.
3. 4 - dedimethylamino - 4-methylamino-5a,6-anhydrotetracycline.
4. 4 - dedimethylamino-4-amino-6-demethyl-5a,6-anhydrotetracycline.
5. 4 - dedimethylamino-4-methylamino-6-demethyl-5a,6-anhydrotetracycline.
6. 7 - chloro-4-dedimethylamino-4-amino-5a,6-anhydrotetracycline.
7. 7 - chloro-4-dedimethylamino-4-methylamino-5a,6-anhydrotetracycline.
8. 7 - chloro-4-dedimethylamino-4-amino-6-demethyl-5a,6-anhydrotetracycline.
9. 7 - chloro-4-dedimethylamino-4-methylamino-6-demethyl-5a,6-anhydrotetracycline.
10. 7 - bromo-4-dedimethylamino-4-amino-5a,6-anhydrotetracycline.
11. 7 - bromo-4-dedimethylamino-4-methylamino-5a,6-anhydrotetracycline.
12. 7 - bromo-4-dedimethylamino-4-amino-6-demethyl-5a,6-anhydrotetracycline.
13. 7 - bromo-4-dedimethylamino-4-methylamino-6-demethyl-5a,6-anhydrotetracycline.
14. A process for producing compounds of the formula:

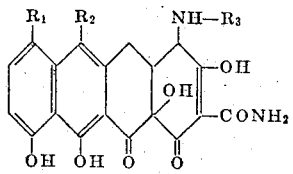

wherein $R_1$ is selected from the group consisting of hydrogen, chlorine and bromine, $R_2$ is selected from the group consisting of hydrogen and methyl and $R_3$ is selected from the group consisting of hydrogen and methyl; which comprises cultivating a strain of a species of the genus Streptomyces in an aqueous nutrient medium containing assimilable sources of carbohydrate, nitrogen and inorganic salts under submerged aerobic conditions and in the presence of a small amount of a methylation inhibitor selected from the group consisting of ethionine and sulfonamides of the formula:

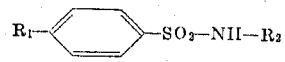

wherein $R_1$ is a member of the group consisting of hydrogen and amino and $R_2$ is a member of the group consisting of phenyl, pyridinyl, triazinyl, pyridazinyl, pyrimidinyl,

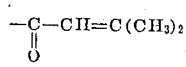

and

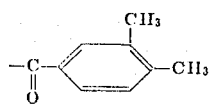

whereby substantial quantities of the tetracycline precursors are produced.

No references cited.

ALEX MAZEL, *Primary Examiner.*

JAMES W. ADAMS, JR., *Assistant Examiner.*